(12) United States Patent
Shindo et al.

(10) Patent No.: US 8,012,337 B2
(45) Date of Patent: Sep. 6, 2011

(54) METHOD FOR COLLECTION OF VALUABLE METAL FROM ITO SCRAP

(75) Inventors: Yuichiro Shindo, Ibaraki (JP); Kouichi Takemoto, Ibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 174 days.

(21) Appl. No.: 12/445,310

(22) PCT Filed: Jun. 27, 2007

(86) PCT No.: PCT/JP2007/062895
§ 371 (c)(1),
(2), (4) Date: Apr. 13, 2009

(87) PCT Pub. No.: WO2008/053616
PCT Pub. Date: May 8, 2008

(65) Prior Publication Data
US 2010/0084281 A1    Apr. 8, 2010

(30) Foreign Application Priority Data

Oct. 24, 2006  (JP) ................................ 2006-288185

(51) Int. Cl.
| C25B 11/04 | (2006.01) |
| C25C 5/02  | (2006.01) |
| C25C 1/22  | (2006.01) |
| C01G 15/00 | (2006.01) |
| C22B 58/00 | (2006.01) |

(52) U.S. Cl. ........ 205/564; 205/346; 423/111; 423/112; 423/122

(58) Field of Classification Search .................. None
See application file for complete search history.

(56) References Cited

U.S. PATENT DOCUMENTS

| 4,950,326 | A  | 8/1990 | Holly |
| 4,981,564 | A  | 1/1991 | Kroll et al. |
| 5,290,412 | A  | 3/1994 | Saito et al. |
| 6,117,209 | A  | 9/2000 | Adanuvor |
| 6,896,788 | B2 | 5/2005 | Shindo et al. |
| 7,157,024 | B2 | 1/2007 | Isaji et al. |
| 7,435,325 | B2 * | 10/2008 | Shindo et al. ............... 205/596 |
| 2009/0004498 | A1 | 1/2009 | Shindo et al. |
| 2010/0072075 | A1 | 3/2010 | Shindo et al. |
| 2010/0084279 | A1 | 4/2010 | Shindo et al. |
| 2010/0084281 | A1 | 4/2010 | Shindo et al. |
| 2010/0101963 | A1 | 4/2010 | Shindo et al. |
| 2010/0101964 | A1 | 4/2010 | Shindo et al. |
| 2010/0193372 | A1 | 8/2010 | Shindo et al. |
| 2010/0282615 | A1 | 11/2010 | Shindo et al. |
| 2010/0288645 | A1 | 11/2010 | Shindo et al. |
| 2010/0288646 | A1 | 11/2010 | Shindo et al. |
| 2010/0294082 | A1 | 11/2010 | Shindo et al. |
| 2010/0316544 | A1 | 12/2010 | Shindo et al. |

FOREIGN PATENT DOCUMENTS

| JP | 06041778 A   | * | 2/1994 |
| JP | 11-343590 A  |   | 12/1999 |
| JP | 2003-247089 A |  | 9/2003 |
| JP | 2005-314786 A |  | 11/2005 |

OTHER PUBLICATIONS

Shindo et al, JP 2003-247089 English Abstract from PAJ Website.*
Shindo et al, JP 2003-247089 English Detailed Description from PAJ Website.*
Saito et al, JP 06-041778 English Abstract from PAJ Website.*
Saito et al, JP 06-041778 English Detailed Description from PAJ Website.*
One page English language Abstract of JP 62-290900 A, Dec. 17, 1987.
One page English language Abstract of JP 08-041560 A, Feb. 13, 1996.
One page English language Abstract of JP 03-082720 A, Apr. 8, 1991.
One page English language Abstract of JP 2000-169991 A, Jun. 20, 2000.
One page English language Abstract of JP 2002-069684 A, Mar. 8, 2002.
One page English language Abstract of JP 2002-069544 A, Mar. 8, 2002.
One page English language Abstract of JP 2002-241865 A, Aug. 28, 2002.

* cited by examiner

*Primary Examiner* — Melvin Mayes
*Assistant Examiner* — Colin W Slifka
(74) *Attorney, Agent, or Firm* — Howson & Howson LLP

(57) ABSTRACT

Proposed is a method for collecting valuable metal from an ITO scrap by subjecting the ITO scrap to electrolysis and collecting the result as metallic indium. Specifically, the present invention proposes a method for selectively collecting metallic indium including the steps of subjecting the ITO scrap to electrolysis in an electrolytic bath partitioned with a diaphragm or an ion-exchange membrane, subsequently extracting anolyte temporarily, eliminating tin contained in the anolyte by a neutralization method, a replacement method or other methods, placing a solution from which the tin was eliminated in a cathode side again and performing electrolysis thereto; or a method for collecting valuable metal from an ITO scrap including the steps of obtaining a solution of In or Sn in an ITO electrolytic bath, eliminating the Sn in the solution, and collecting In in the collecting bath. These methods enable the efficient collection of metallic indium from an ITO scrap of an indium-tin oxide (ITO) sputtering target or an ITO scrap such as ITO mill ends arisen during the manufacture of such ITO sputtering target.

3 Claims, No Drawings

METHOD FOR COLLECTION OF VALUABLE METAL FROM ITO SCRAP

BACKGROUND OF THE INVENTION

The present invention relates to a method for collecting valuable metal from an ITO scrap such as a spent indium-tin oxide (ITO) sputtering target or ITO mill ends arisen during the manufacture of the ITO sputtering target (hereinafter collectively referred to as an "ITO scrap" in this specification).

In recent years, an indium-tin oxide ($In_2O_3$—$SnO_2$: generally known as ITO) sputtering target is being widely used for a transparent conductive thin film of an LCD device or a gas sensor. In many cases, however, a thin film is formed on a substrate or the like by employing the sputtering method as the thin-film forming means.

Although the sputtering method as the thin-film forming means is a superior method, if a sputtering target is used to form a transparent conductive thin film, the target will not be consumed uniformly. A portion of the target with severe consumption is generally referred to as an eroded portion, and the sputtering operation is continued until immediately before a backing plate supporting the target becomes exposed due to the further consumption of the eroded portion. This target is subsequently replaced with a new target.

Accordingly, a spent sputtering target will have numerous non-eroded portions; that is, unused portions of the target, and all of these portions become scrap. Moreover, even during the manufacture of ITO sputtering targets, scraps will arise from mill ends, grinding dust and cutting wastage. Generally speaking, the scrap contains roughly 9.7 wt % of tin oxide ($SnO_2$), but the scrap is mostly indium oxide ($In_2O_3$).

Because high-purity materials are used as the ITO sputtering target material and because indium is particularly expensive, indium and tin are simultaneously collected from the foregoing scrap materials. As this kind of indium collection method, conventionally, a method that combines wet refining such as the acid solution process, ion exchange method, and solvent extraction method is used.

For instance, there is a method of subjecting an ITO scrap to cleansing and pulverization, dissolving the ITO scrap in acid such as hydrochloric acid or nitric acid, precipitating and eliminating impurities, such as zinc, tin, lead and copper, as sulfide by passing hydrogen sulfide through the solution, thereafter adding ammonia to neutralize the solution, and collecting the resulting indium hydroxide.

Nevertheless, the indium hydroxide obtained by the foregoing method has inferior filtration property, requires long operational process, and contains large amounts of impurities such as Si and Al. In addition, with the created indium hydroxide, since the grain size and grain size distribution will vary depending on the neutralization condition, maturization condition and other conditions, there is a problem in that the characteristics of the ITO target cannot be stably maintained upon subsequently manufacturing such ITO target.

Conventional technology and its advantages and disadvantages are described below.

As one example of such conventional technology, there is an etching method of a transparent conductive film including the steps of reducing an ITO film deposited on a substrate by an electrochemical reaction in the electrolyte, and dissolving the reduced transparent conductive film in the electrolyte (refer to Patent Document 1). However, the object of this method is to obtain a mask pattern with high precision, and relates to technology that is different from the collection method.

For pretreatment to collect valuable metal from ITO, there is also technology of separating, in the electrolyte, the impurities contained in an In-based brazing filler material used in the bonding with the backing plate (refer to Patent Document 2). Nevertheless, this method does not relate to technology of directly collecting valuable metal from ITO.

Moreover, upon collecting indium from an intermediate obtained as a by-product of the zinc refining process or an ITO scrap, disclosed is technology of separating tin as halogenated stannate, performing reduction treatment with hydrochloric acid or nitric acid solution, subsequently adjusting the pH of this aqueous solution to 2 to 5, reducing metallic ions of iron, zinc, copper, thallium and the like in order to make the metallic ions into a substance that will not precipitate easily, and separating the indium component in the aqueous solution (refer to Patent Document 3). With this technology, however, there is a problem in that the refining process is complicated, and a superior refining effect cannot be expected.

Further, as a method for collecting high-purity indium, disclosed is technology of dissolving ITO in hydrochloric acid, adding alkali thereto to make the pH 0.5 to 4, eliminating tin as hydroxide, subsequently blowing hydrogen sulfide gas in order to eliminate hazardous materials such as copper and lead as sulfide, and electrowinning indium metal by performing electrolysis using the obtained solution (refer to Patent Document 4). There is a problem with this technology in that the refining process is complicated.

In addition, proposed is a method of dissolving an ITO indium-containing scrap in hydrochloric acid to obtain an indium chloride solution, adding a sodium hydroxide solution to this solution to eliminate tin as tin hydroxide, additionally adding a sodium hydroxide solution after the elimination to obtain indium hydroxide, filtering the obtained indium hydroxide to obtain indium sulfate from the filtered indium hydroxide, and obtaining indium by electrowinning the indium sulfate (refer to Patent Document 5). Although this is an effective method with a significant refining effect, there is a drawback in that the process is complicated.

Also proposed is a method for collecting indium including the steps of dissolving an ITO indium-containing scrap in hydrochloric acid to obtain an indium chloride solution, adding a sodium hydroxide solution to the indium chloride solution to eliminate tin contained in the scrap as tin hydroxide, substituting indium with zinc from the solution after eliminating the tin hydroxide, and thereafter collecting indium (refer to Patent Document 6). Although this is also an effective method with a significant refining effect, there is a drawback in that the process is complicated.

Additionally disclosed is a method for collecting metallic indium including the steps of extracting suboxide-containing cast scrap floating on molten metallic indium, introducing this into an atmosphere furnace, introducing argon gas into the furnace after vacuating the furnace once, heating the furnace to a prescribed temperature, and reducing the suboxide-containing cast scrap (refer to Patent Document 7).

Although this is in itself an effective method, there is a drawback in that this is not a fundamental collection method of ITO scrap.

In light of the above, a method that is efficient and with a versatile collection process is being sought.

[Patent Document 1] Japanese Patent Laid-Open Publication No. S62-290900

[Patent Document 2] Japanese Patent Laid-Open Publication No. H8-41560

[Patent Document 3] Japanese Patent Laid-Open Publication No. H3-82720

[Patent Document 4] Japanese Patent Laid-Open Publication No. 2000-169991

[Patent Document 5] Japanese Patent Laid-Open Publication No. 2002-69684

[Patent Document 6] Japanese Patent Laid-Open Publication No. 2002-69544

[Patent Document 7] Japanese Patent Laid-Open Publication No. 2002-241865

SUMMARY OF THE INVENTION

In order to overcome the foregoing problems, the present invention provides a method for efficiently collecting indium from an ITO scrap of an indium-tin oxide (ITO) sputtering target or an ITO scrap such as ITO mill ends arising during the manufacture of such ITO sputtering target.

Specifically, the present invention provides a method for collecting valuable metal from an ITO scrap including the steps of subjecting the ITO scrap to electrolysis as an anode and collecting the result as indium. As the electrolyte upon collecting valuable metal from the ITO scrap, sulfuric acid solution, hydrochloric acid solution, nitric acid solution or the like is primarily used. In addition, an electrolytic solution to which an electrolyte such as ammonium sulfate, ammonium nitrate, sodium chloride or sodium sulfate is added as needed may also be used. Electrolyte of an alkali solution may also be used. There is no particular limitation on the foregoing electrolyte solution, and conditions for efficiently collecting valuable metal may be arbitrarily selected.

The conditions for performing electrolysis to the scrap such as mill ends are not uniformly defined, and the current density is appropriately selected according to the amount of such mill ends or the property of the material. The liquid temperature of the electrolyte solution is generally in the range of 0 to 100° C., and preferably in the range of 20 to 50° C.

The method for collecting indium by electrolysis according to the present invention is an extremely simple method since the ITO scrap is simply subject to electrolysis as an anode. Nevertheless, no conventional technology has previously adopted this kind of method.

The present invention is also able to selectively collect metallic indium by subjecting an ITO scrap to electrolysis in an electrolytic bath partitioned with a diaphragm or an ion-exchange membrane, subsequently extracting anolyte temporarily, eliminating tin contained in the anolyte by a neutralization method, a replacement method or other methods, placing the anolyte from which the tin was eliminated in a cathode side again, and performing electrolysis thereto.

It is also possible to separately provide an ITO electrolytic bath and an indium collecting bath, dissolve the ITO in the dissolution bath, and thereafter collect indium in the indium collecting bath. The electrolytic method, neutralization method or the like may be used as the collection method. Once indium is collected from the ITO, a recycled ITO can be easily manufactured with the obtained indium as the raw material. The present invention covers all of the foregoing aspects.

The provided method for efficiently collecting indium is a superior method since indium can be collected extremely easily; that is, an ITO scrap of an indium-tin oxide (ITO) sputtering target or an ITO scrap such as ITO mill ends arising during the manufacture of such ITO sputtering target is simply subject to electrolysis as an anode.

DETAILED DESCRIPTION OF THE INVENTION

The present invention provides a method for collecting metallic indium simply from an indium-containing scrap of an ITO target by electrolysis.

As the electrolyte, an acid solution of sulfuric acid, hydrochloric acid, nitric acid or the like can be used, and electrolyte added with ammonium sulfate, ammonium nitrate, sodium chloride, sodium sulfate or the like may also be used. In order to improve the current efficiency, well-known additive agents may also be used. The use of an additive agent is subject to the condition that such additive agent will not deteriorate the purity of the product.

Since the object of the present invention can be attained if it is possible to perform electrolysis, alkali electrolyte may also be used. The present invention covers all of the foregoing aspects.

A special electrolytic apparatus is not required. For instance, the ITO to be subject to electrolysis is used as the anode, and a corrosion-resisting electrode such as carbon is used as the cathode mother plate when performing electrolysis. It is thereby possible to avoid the increase or inclusion of impurities in the anode.

In order to independently obtain metallic indium, the anode and the cathode are placed in an electrolytic bath partitioned with a diaphragm or an anion-exchange membrane, anolyte is temporarily extracted after performing electrolysis, tin (Sn) is subsequently eliminated from the anolyte, a solution containing In is placed in the cathode side again and subject to electrolysis, and indium is electrodeposited on the cathode to collect metallic indium. Moreover, it is also possible to dissolve In or Sn in an ITO electrolytic bath, extract the solution to eliminate Sn, and thereafter collect In in the In collecting bath. The electrolytic method, neutralization method or the like may be used as the collection method.

As the method for eliminating tin (Sn) from the anolyte, the neutralization method, replacement method, metastannic acid method, hydrolysis method or the like may be used. The neutralization method is able to achieve neutralization with an alkali solution of sodium hydroxide, potassium hydroxide, ammonia or the like when performing electrolysis using an acidic bath, and achieve neutralization with an acid fluid when using an alkali electrolytic bath. The replacement method can be achieved by replacement with indium sponge powder or the like. The metastannic acid method is able to eliminate Sn as metastannic acid by using nitric acid. The hydrolysis method can be achieved through air bubbling or adding an oxidizing agent such as $H_2O_2$ to change $Sn^{2+}$ to $Sn^{4+}$, and thereby generating $Sn(OH)_4$. A conventional neutralization method, replacement method, metastannic acid method, or hydrolysis method may be adopted, and there is no particular limitation on the use thereof.

In this case, a small amount of Sn may remain in the anolyte. However, since Sn itself is of high purity when collecting the obtained In and recycling the ITO, it is possible to analyze the Sn content in the obtained material, adjust the Sn content by comprehending such Sn content, and prepare a prescribed ITO.

It is desirable to adjust the current density as needed based on the type of raw material. The factor to be adjusted in this case is only the production efficiency. Although there is no particular limitation on the electrolysis temperature, desirably electrolysis is performed by adjusting the temperature to be in a range of 0 to 100° C. Since the current efficiency will deteriorate if the electrolysis temperature is less than 0° C. and the evaporation of the electrolyte will increase if the electrolysis temperature exceeds 100° C., a more preferable range of the electrolysis temperature is 20 to 50° C.

EXAMPLES

The present invention is now explained in detail with reference to the Examples. These Examples are merely illustrative, and the present invention shall in no way be limited thereby. In other words, various modifications and other embodiments based on the technical spirit claimed in the claims shall be included in the present invention as a matter of course.

Example 1

2 kg of spent scrap of ITO (indium oxide-tin oxide) was used as the raw material. The components in this raw material were 9.7 wt % of tin oxide ($SnO_2$) and the remainder indium oxide ($In_2O_3$). The raw material was used as an anode, and electrolysis was performed in a nitric acid bath of pH2 at a liquid temperature of 20° C. Consequently, Sn was precipitated and eliminated as metastannic acid. In was electrodeposited on the cathode side.

According to the foregoing process, approximately 1.40 kg of In was collected from the ITO (indium oxide-tin oxide) mill ends.

Example 2

2 kg of the same spent scrap as Example 1 was used as the raw material. The raw material was used as an anode, and electrolytic refining was performed in a nitric acid bath of 1N at a liquid temperature of 20° C. The electrolytic conditions are described below. Consequently, Sn was precipitated and eliminated as metastannic acid. In was electrodeposited on the cathode side.

According to the foregoing process, approximately 1.30 kg of In was collected from the ITO (indium oxide-tin oxide) mill ends.

Example 3

2 kg of ITO (indium oxide-tin oxide) mill ends were used as the raw material. The components in this raw material were 9.7 wt % of tin oxide ($SnO_2$) and the remainder indium oxide ($In_2O_3$).

The raw material was used as an anode, the cathode side and the anode side were partitioned with an anion-exchange membrane, and electrolysis was performed in a sulfuric acid bath of 4N at a liquid temperature of 30° C. Subsequently, the anolyte solution was extracted and neutralized with sodium hydroxide (NaOH) to achieve pH2, and Sn in the anolyte was eliminated as hydroxide. The solution from which Sn was eliminated was placed in the cathode side and subject to electrolysis once again, and In was electrodeposited on the cathode.

Consequently, it was possible to obtain In with low Sn content. According to the foregoing process, approximately 1.35 kg of metallic In was collected from the ITO (indium oxide-tin oxide) mill ends.

Example 4

2 kg of the same mill ends as Example 3 were used as the raw material. The raw material was used as an anode, the cathode side and the anode side were partitioned with an anion-exchange membrane, and electrolysis was performed in a sulfuric acid bath of pH2 added with 50 g/L of ammonium sulfate at a liquid temperature of 20° C.

Subsequently, the anolyte solution was extracted, the bivalent ions of Sn were made to be quadrivalent ions by air bubbling, and these were precipitated as hydroxide by hydrolysis. The In-containing solution from which hydroxide was eliminated was placed in the cathode side and subject to electrolysis once again, and In was electrodeposited on the cathode.

Consequently, it was possible to obtain In with low Sn content. According to the foregoing process, approximately 1.4 kg of metallic In was collected from the ITO (indium oxide-tin oxide) mill ends.

Example 5

2 kg of the same spent scrap as Example 1 was used as the raw material. The raw material was used as an anode, the cathode side and the anode side were partitioned with a diaphragm, and electrolysis was performed in a hydrochloric acid bath of 4N at a liquid temperature of 25° C. Subsequently, the anolyte solution was extracted and an In sponge was added thereto in order to eliminate Sn in the anolyte by displacement deposition.

The solution from which Sn was eliminated was placed in the cathode side and subject to electrolysis once again, and In was electrodeposited on the cathode. Consequently, it was possible to obtain In with low Sn content. According to the foregoing process, approximately 1.4 kg of metallic In was collected from the ITO (indium oxide-tin oxide) mill ends.

Incidentally, the same results were obtained when sodium chloride was added in the hydrochloric acid bath as the electrolytic bath.

Example 6

2 kg of the same spent scrap as Example 1 was used as the raw material. The raw material was used as an anode, the cathode side and the anode side were partitioned with an anion-exchange membrane, and electrolysis was performed in a nitric acid bath of 1N added with 50 g/L of ammonium nitrate at a liquid temperature of 25° C. Subsequently, the anolyte solution was extracted and Sn was precipitated and eliminated as metastannic acid.

The In-containing solution from which Sn was eliminated was placed in the cathode side and subject to electrolysis once again, and In was electrodeposited on the cathode. Consequently, it was possible to obtain In with low Sn content.

According to the foregoing process, approximately 1.4 kg of metallic In was collected from the ITO (indium oxide-tin oxide) mill ends.

Example 7

2 kg of ITO (indium oxide-tin oxide) scrap was placed in the anode box side of the dissolution bath and dissolved with a sulfuric acid solution of 3N to prepare a mixed solution of In and Sn. The components in this raw material were 9.7 wt % of tin oxide ($SnO_2$) and the remainder indium oxide ($In_2O_3$). The cathode box side was similarly a sulfuric acid solution of 3N, and this was partitioned with an anion-exchange membrane so as not to electrodeposit on the cathode.

The mixed solution of In and Sn was adjusted to pH2, and Sn was eliminated as hydroxide. The In-containing solution from which Sn was eliminated was subject to electrolysis in a collecting bath to obtain In. According to the foregoing process, approximately 1.45 kg of metallic In was collected from the ITO (indium oxide-tin oxide) scrap.

Example 8

2 kg of ITO (indium oxide-tin oxide) scrap was placed in the anode box side of the dissolution bath and dissolved with a sulfuric acid solution of 3N to prepare a mixed solution of In and Sn. The components in this raw material were 9.7 wt % of tin oxide ($SnO_2$) and the remainder indium oxide ($In_2O_3$). The cathode box side was similarly a sulfuric acid solution of 3N, and this was partitioned with an anion-exchange membrane so as not to electrodeposit on the cathode.

Subsequently, an oxidizing agent ($H_2O_2$) was placed in the mixed solution of In and Sn, the solution was subject to hydrolysis to change Sn from $Sn^{2+}$ to $Sn^{+4}$, and Sn was eliminated as hydroxide. This solution was placed in the collecting bath, and electrolysis was performed to collect approximately 1.4 kg of In.

Although in each of the foregoing Examples, ITO (indium oxide-tin oxide) mill ends or ITO scraps containing 9.7 wt % of tin oxide ($SnO_2$) and remainder indium oxide ($In_2O_3$) were used, it is possible to arbitrarily change the electrolytic conditions such as the current density and pH according to the component amount of $In_2O_3$ and $SnO_2$, and it goes without saying that there is no particular limitation on the component amount of the raw material. In particular, although the content of tin oxide ($SnO_2$) in the ITO is changed between 5 wt % to 30 wt %, the present invention can still be applied to this case.

In addition, although there are cases where small amounts of accessory components are added to the ITO, so as long as ITO is the basic constituent, it goes without saying that the present invention can also be applied to this case.

The present invention yields a significant industrial advantage in terms of recycling of the expensive indium, since provided is a superior method in which high-purity metallic indium can be collected extremely easily and efficiently; that is, an ITO scrap of an indium-tin oxide (ITO) sputtering target or an ITO scrap such as ITO mill ends arising during the manufacture of such ITO sputtering target is simply subject to electrolysis as an anode.

The invention claimed is:

1. A method for collecting valuable metal from an ITO scrap including the steps of arranging a cathode in an electrolytic cell and ITO scrap as an anode in the electrolytic cell, subjecting the ITO scrap to electrolysis as the anode, electrodepositing metallic indium on the cathode, and collecting the electrodeposited indium from the cathode.

2. A method for collecting valuable metal from an ITO scrap including the steps of arranging a cathode in an electrolytic cell and ITO scrap as an anode in the electrolytic cell, subjecting the ITO scrap to electrolysis as the anode in the electrolytic cell partitioned with a diaphragm or an ion-exchange membrane so as to obtain anolyte containing indium, subsequently extracting the anolyte temporarily, eliminating tin contained in the extracted anolyte, placing the extracted anolyte from which the tin was eliminated in a cathode side of the partitioned electrolytic cell, performing electrolysis thereto to electrodeposit metallic indium on the cathode, and selectively collecting electrodeposited metallic indium from the cathode.

3. A method for collecting valuable metal from an ITO scrap including the steps of providing an ITO electrolytic cell and an indium collecting cell, subjecting the ITO scrap to electrolysis as an anode in the electrolytic cell, obtaining anolyte containing indium by the electrolysis, placing the anolyte in the collecting cell, and collecting indium from the anolyte containing indium in the collecting cell.

* * * * *